May 1, 1951          G. C. HARDIE          2,551,325
EXPANSION JOINT
Filed April 18, 1949
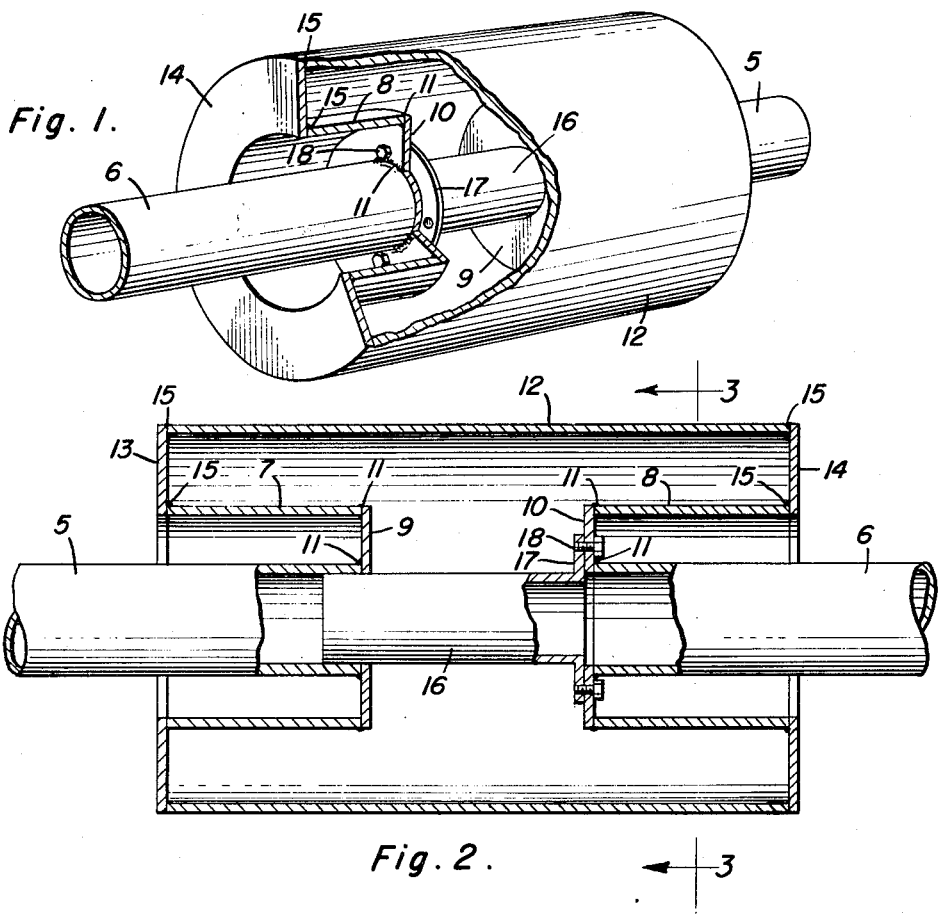
Inventor
George C. Hardie
By Clarence A. O'Brien
and Harvey B. Jacobson
Attorneys Patented May 1, 1951

2,551,325

UNITED STATES PATENT OFFICE 2,551,325

EXPANSION JOINT

George C. Hardie, Brooklyn, N. Y.

Application April 18, 1949, Serial No. 88,190

3 Claims. (Cl. 285—162)

This invention relates to conduits for conveying steam or other fluids at high temperatures, and has particular reference to an improved joint or connection between adjacent axially aligned sections of such a conduit which will allow axial and radial expansion of said sections without causing leakage at the joint.

An object of the present invention is to provide a simple and efficient joint of the above kind which includes means to afford a smooth and unobstructed passage of the fluid from one conduit section to the other.

The exact nature of the present invention will become apparent from the following description when considered with the accompanying drawing, in which:

Figure 1 is a perspective view, partly broken away and in section, showing a joint between adjacent conduit sections which embodies the present invention.

Figure 2 is a central longitudinal sectional view thereof.

Figure 3 is a transverse section taken on the line 3—3 of Figure 2.

Referring in detail to the drawing, 5 and 6 indicate two adjacent axially alined sections of a conduit connected together by means of a joint or connection constructed in accordance with the present invention.

The present joint includes two tubular members 7 and 8 surrounding the conduit sections 5 and 6, respectively, in spaced concentric relation thereto. The adjacent ends of the sections 5 and 6 are respectively connected to the corresponding ends of the respective tubular members 7 and 8 by means of flat annular rings or flanges 9 and 10 which may be welded to said sections and members as at 11. A further tubular member 12 surrounds the tubular members 7 and 8 in spaced concentric relation thereto, and the remaining ends of said members 7 and 8 are connected to the respective ends of the tubular member 12 by means of flat annular rings or flanges 13 and 14 which may be welded to said members as at 15.

It will be noted that the rings or flanges may flex to allow axial expansion of the sections 5 and 6. Also, as annular spaces are formed between the sections 5 and 6 and the tubular members 7 and 8, and between the members 7 and 8 and member 12, radial expansion of the parts is permitted.

A pipe 16 has a flange 17 at one end which is bolted or otherwise suitably secured at 18 to the ring or flange 10, and the other end of pipe 16 slidably fits in the adjacent end of section 5 to afford smooth and unobstructed passage of the fluid from one conduit section to the other.

From the foregoing description, the construction, operation and advantages of the present invention will be readily understood by those skilled in the art. Modifications and changes in details are contemplated within the spirit and scope of the invention as claimed.

What is claimed as new is:

1. In combination, two adjacent axially alined conduit sections defining a space between them for permitting axial expansion thereof, and means for connecting said conduit sections including axially spaced tubular members disposed in spaced concentric surrounding relation to the adjacent end portions of the respective conduit sections, flat annular flanges connecting the adjacent ends of said conduit sections to the corresponding ends of the respective tubular members, a further tubular member disposed in spaced concentric surrounding relation to said first-named tubular members, and further flat annular flanges connecting the other ends of said first-named tubular members to the ends of said further tubular member.

2. In combination, two adjacent axially alined conduit sections defining a space between them for permitting axial expansion thereof, and means for connecting said conduit sections including axially spaced tubular members disposed in spaced concentric surrounding relation to the adjacent end portions of the respective conduit sections, flat annular flanges connecting the adjacent ends of said conduit sections to the corresponding ends of the respective tubular members, a further tubular member disposed in spaced concentric surrounding relation to said first-named tubular members, and further flat annular flanges connecting the other ends of said first-named tubular members to the ends of said further tubular member, said flanges being welded to the ends of said conduit sections and tubular members.

3. The construction defined in claim 1, in combination with a pipe slidably fitted at one end in one conduit section and having a flange at its other end secured to the flange connecting the other conduit section to the tubular member surrounding the same.

GEORGE C. HARDIE.

REFERENCES CITED

The following references are of record in the file of this patent:

UNITED STATES PATENTS

| Number | Name | Date |
| --- | --- | --- |
| 1,319,457 | Bogart | Oct. 21, 1919 |
| 2,046,124 | Kleekamp | June 30, 1936 |
| 2,317,598 | Francois | Apr. 27, 1943 |
| 2,481,472 | Culp | Sept. 6, 1949 |